(12) United States Patent
Pinnell et al.

(10) Patent No.: US 9,013,139 B2
(45) Date of Patent: Apr. 21, 2015

(54) ADAPTIVE CHARGER DEVICE AND METHOD

(75) Inventors: Leslie J. Pinnell, Framingham, MA (US); David C. Batson, Winchester, MA (US); Alexander Kaplan, Providence, RI (US)

(73) Assignee: The Gillette Company, Boston, MA (US)

( * ) Notice: Subject to any disclaimer, the term of this patent is extended or adjusted under 35 U.S.C. 154(b) by 850 days.

(21) Appl. No.: 11/775,987

(22) Filed: Jul. 11, 2007

(65) Prior Publication Data

US 2008/0238361 A1   Oct. 2, 2008

Related U.S. Application Data

(60) Provisional application No. 60/908,017, filed on Mar. 26, 2007.

(51) Int. Cl.
*H02J 7/00* (2006.01)
*H02J 7/04* (2006.01)

(52) U.S. Cl.
CPC ............. *H02J 7/045* (2013.01); *H02J 7/0008* (2013.01)

(58) Field of Classification Search
USPC .......... 320/106–107, 110, 112–113, 137, 145
See application file for complete search history.

(56) References Cited

U.S. PATENT DOCUMENTS

| | | | |
|---|---|---|---|
| 5,592,070 A | 1/1997 | Mino | |
| 5,670,862 A | 9/1997 | Lewyn | |
| 5,684,387 A | 11/1997 | Patino | |
| 5,818,202 A | 10/1998 | Miyamoto et al. | |
| 5,986,430 A | 11/1999 | Fernandez et al. | |
| 6,114,838 A * | 9/2000 | Brink et al. | 320/136 |
| 6,127,804 A | 10/2000 | Oglesbee et al. | |
| 6,534,953 B2 | 3/2003 | Shirakawa | |
| 6,534,954 B1 | 3/2003 | Plett | |
| 7,071,653 B2 | 7/2006 | Suzuki et al. | |
| D532,372 S | 11/2006 | Keating | |
| D532,745 S | 11/2006 | Gaber et al. | |
| 7,227,336 B1 | 6/2007 | van Schalkwijk et al. | |
| 7,656,131 B2 * | 2/2010 | Embrey et al. | 320/162 |
| 2004/0234865 A1 | 11/2004 | Sato et al. | |
| 2005/0110498 A1* | 5/2005 | Plett | 324/433 |
| 2005/0141875 A1* | 6/2005 | Fukushima | 386/94 |

(Continued)

FOREIGN PATENT DOCUMENTS

| | | |
|---|---|---|
| DE | 39 24 499 A1 | 1/1991 |
| EP | 0 611 106 A1 | 8/1994 |

(Continued)

OTHER PUBLICATIONS

"Portable Energy Storage and Charging Device" U.S. Appl. No. 11/775,995, filed Jul. 11, 2007 David C. Batson et al.

(Continued)

*Primary Examiner* — Edward Tso
*Assistant Examiner* — Ramy Ramadan
(74) *Attorney, Agent, or Firm* — Fish & Richardson P.C.

(57) ABSTRACT

Disclosed is a method for charging a rechargeable battery that includes at least one rechargeable electrochemical cell is disclosed. The method includes measuring at least one electrical characteristic of the battery, and determining a charging current to be applied to the battery based on the at least one measured electrical characteristic.

26 Claims, 4 Drawing Sheets

(56) References Cited

U.S. PATENT DOCUMENTS

| | | | |
|---|---|---|---|
| 2005/0194934 A1 | 9/2005 | Iijima et al. | |
| 2005/0233218 A1 | 10/2005 | Ogawa et al. | |
| 2005/0244716 A1 | 11/2005 | Ogawa et al. | |
| 2006/0061330 A1 | 3/2006 | Sato et al. | |
| 2006/0152191 A1* | 7/2006 | Lee et al. | 320/106 |
| 2006/0164035 A1 | 7/2006 | Van Beek et al. | |
| 2006/0197496 A1 | 9/2006 | Iijima et al. | |
| 2006/0208695 A1 | 9/2006 | Weinstein et al. | |
| 2007/0037049 A1 | 2/2007 | Iijima et al. | |
| 2007/0063669 A1 | 3/2007 | Keating | |
| 2007/0075682 A1* | 4/2007 | Guang et al. | 320/128 |
| 2007/0079153 A1* | 4/2007 | Bain et al. | 713/300 |

FOREIGN PATENT DOCUMENTS

| | | |
|---|---|---|
| EP | 1 712 924 A1 | 10/2006 |
| JP | 2006012613 A | 1/2006 |
| WO | WO2006097586 A1 | 9/2006 |
| WO | WO2007017164 A2 | 2/2007 |
| WO | WO2007017165 A2 | 2/2007 |

OTHER PUBLICATIONS

"Ultra Fast Battery Charger with Battery Sensing" U.S. Appl. No. 11/776,261, filed Jul. 11, 2007 Jordan T. Bourilkov et al.

"Lithium Iron Phosphate Ultra Fast Battery Charger" U.S. Appl. No. 11/775,966, filed Jul. 11, 2007 Jordan T. Bourilkov et al.

"Fast Battery Charger Device and Method" U.S. Appl. No. 11/776,021, filed Jul. 11, 2007 Leslie J. Pinnell et al.

"Battery Charger with Mechanism to Automatically Load and Unload Batteries" U.S. Appl. No. 11/775,979, filed Jul. 11, 2007 Matthew R. Stone et al.

"Single Electrochemical Cell with Integrated Voltage Converter Module" U.S. Appl. No. 11/776,350, filed Jul. 11, 2007 George Cintra et al.

Diaz et al., "Intelligent and Universal Fast Charger for Ni—Cd and Ni-MH Batteries in Portable Applications", IEEE Transactions on Industrial Electronics, vol. 31, No. 4, Aug. 2004.

Poon et al., "A Constant-Power Battery Charger With Inherent Soft Switching and Power Factor Correction", IEEE Transactions on Industrial Electronics, vol. 18, No. 6, Nov. 2003.

Texas Instruments, "BQ2000: Programmable Multi-Chemistry Fast-Charge Management IC", Internet Article, Feb. 2001.

* cited by examiner

ADAPTIVE CHARGER DEVICE AND METHOD

CROSS-REFERENCE TO RELATED APPLICATIONS

This application claims priority to U.S. Provisional Application Ser. No. 60/908,017, entitled "Adaptive Charger Device and Method" and filed on Mar. 26, 2007, the content of which is hereby incorporated by reference in its entirety.

BACKGROUND

Conventional chargers rely on an electrical, mechanical or digital signal technique to determine the type of battery being charged and thus the appropriate charge regime to apply. For example, some techniques are based on the use of an internal battery ID resistor, the value of which determines the charging parameters applied for that specific battery. Mechanical techniques have also been used, such as using the location of a connector polarity key or the location of a particular connector pin to distinguish between different battery models requiring different charging parameters. The Smart Battery SMBus standards, for example, use a serial data communications interface to communicate the charging parameters to the charging device. The above approaches require added connection points beyond the battery power terminals or some added mechanical feature not required for the basic battery function of delivering stored energy to a portable device. In the case of the Smart Battery standards, for example the SMBus standard, an electrical circuit and at least two additional connector pins are required to implement the smart interface between the charger and battery, adding to the cost, complexity and size of the battery.

SUMMARY

In one aspect, a method for charging a rechargeable battery that includes at least one rechargeable electrochemical cell is disclosed. The method includes measuring at least one electrical characteristic of the battery, and determining a charging current to be applied to the battery based on the at least one measured electrical characteristic.

Embodiments may include one or more of the following.

The method may include applying the determined charging current to the battery. The method may further include regulating current applied to the battery according to the determined charging current.

Measuring the at least one electrical characteristic may include measuring voltage between terminals of the battery in response to applying current to the battery at a first time instance, and measuring voltage between the terminals of the battery in response to applying current to the battery at a subsequent time instance. Measuring the at least one electrical characteristic may further include computing a steady-state charging resistance based on a difference between the voltage measured at the first and subsequent time instances divided by a difference in currents applied at the first and subsequent time instances Determining the charging current may include accessing a lookup table storing multiple charging current values, associated with a corresponding one of a plurality of values for a measured parameter, and selecting one of the multiple charging current values stored in the lookup table based, at least in part, on the computed value. The measured parameter may be representative of a steady-state charging resistance of the battery.

The method may further include periodically measuring the voltage between terminals of the battery, adjusting the charging current applied to the battery when the measured voltage between the terminals of the battery reaches a predetermined voltage value such that the voltage between the terminals of the battery is maintained at the predetermined voltage value.

The method may further include periodically adjusting the charging current to cause a pre-determined voltage level between terminals of the battery to be reached within a specified time period. Periodically adjusting the charging current may include determining a rate of voltage rise at the terminals of the battery, and computing the charging current based on the determined rate of voltage rise using a predictor-corrector computation technique. The predictor-corrector computation technique may be based on a Kalman filter.

In another aspect, a charging device configured to charge a rechargeable battery that includes at least one rechargeable electrochemical cell is disclosed. The device includes a charging compartment configured to receive the battery, the charging compartment having electrical contacts configured to be coupled to respective terminals of the battery, and a controller. The controller is configured to measure at least one electrical characteristic of the battery, and determine a charging current to be applied to the battery based on the at least one measured electrical characteristic.

Like the method aspect, embodiments of the device may include any feature corresponding to any of the features as set forth above for the method, as well as one or more of the following.

The controller may include a processor-based micro-controller.

The device may further include the rechargeable battery. The rechargeable battery may include a lithium-iron-phosphate rechargeable battery.

One or more of the above aspects may include one or more of the following advantages.

The charger adaptively determines the correct charging current for a rechargeable battery or cell of a particular rechargeable cell chemistry based upon a dynamic measurement of the battery or cell internal charging resistance, and adjusts the charging rate based on that charging resistance to accomplish a full, or near fall, charge in the least amount of time possible or within a specific time target. This approach is useful for a universal charger intended to charge a wide variety of batteries or cells with differing capacities and rate capabilities. By use of the devices and approaches described herein, a particular battery does not require an electrical contact dedicated to enabling the determination of the charging current, nor is a mechanical device required to determine the maximum allowable charge current. By using the devices and approaches described herein, many different size cells and/or batteries can be charged at high charge rates using a single charging device without requiring prior knowledge of the specific type of battery and with minimal risk of causing electrical, chemical or thermal damage to the battery or cell being charged.

Other features and advantages of the invention will be apparent from the description and from the claims.

DETAILED DESCRIPTION

Disclosed is a charger configured to determine, apply and control charging current for charging a rechargeable battery without the need for prior knowledge of the battery type and/or capacity. The charger is not limited to, but is particularly useful for charging battery cells of various sizes, including battery cells used in many modern portable consumer electronic products, such as cellular telephones, MP3 players and digital cameras. The disclosed charger may be applied to many different rechargeable battery types, including lithium ion batteries having high rate charge capability, such as those using lithium iron-phosphate or similar phosphate based intercalation compounds as one of the battery electrodes, as well as lithium-ion batteries, and also lead-acid, nickel metal hydride, nickel cadmium, nickel zinc, and silver zinc batteries. The disclosed charger may further be configured to charge different types of batteries, including, for example, cylindrical batteries, prismatic batteries, button-cell batteries, and so forth.

Figure 1:
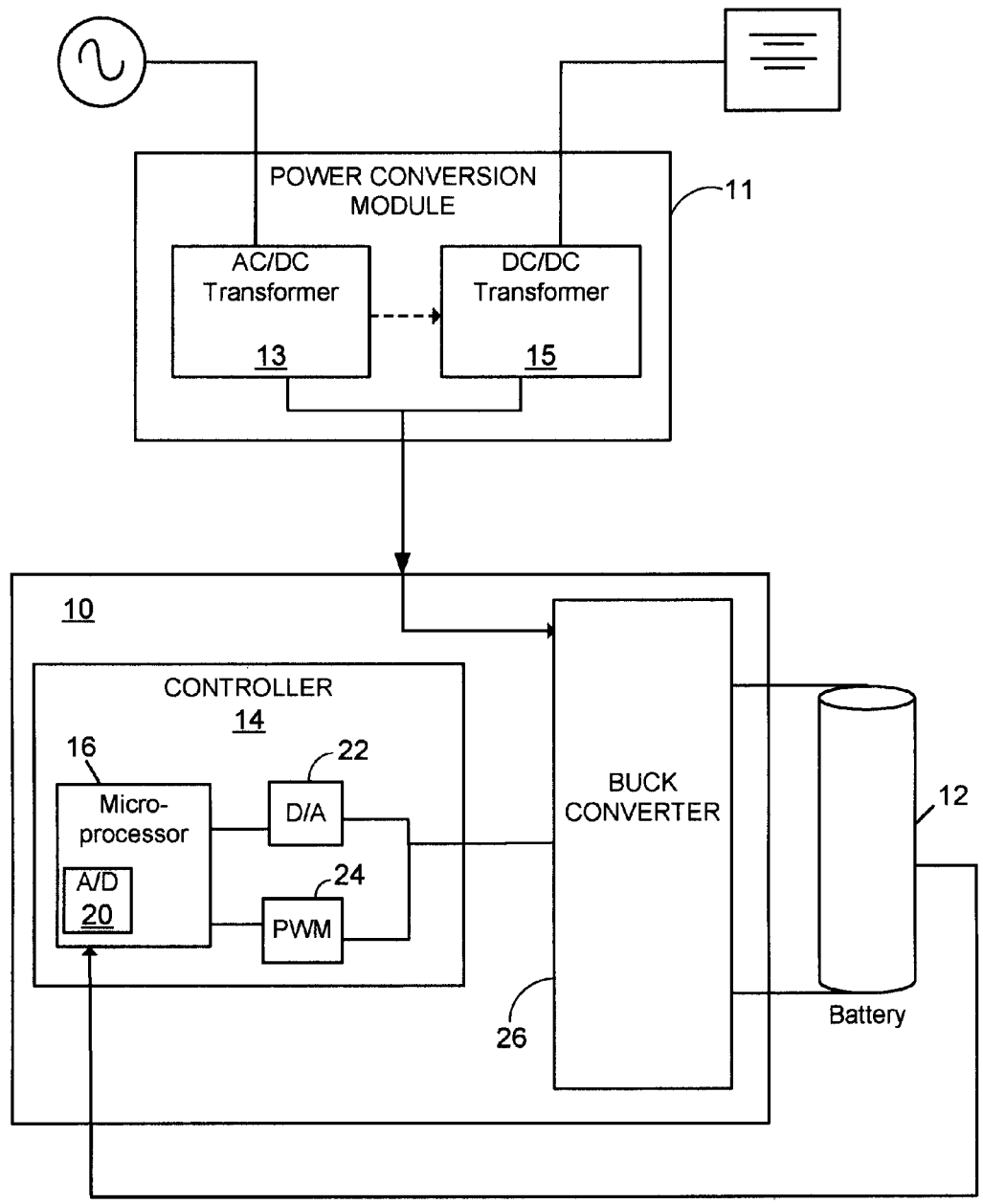
FIG. 1 is a block diagram of an exemplary embodiment of an adaptive charger.

FIG. 1 shows an adaptive charger 10 configured to measure and/or determine at least one electric characteristic of a battery 12 having one or more electrochemical cells, that is received in a receptacle or compartment (not shown) of the charger 10. The battery 12 can be a secondary cell (or battery) or a primary cell (battery). Primary electrochemical cells are meant to be discharged, e.g., to exhaustion, only once, and then discarded. Primary cells are not intended to be recharged. Primary cells are described, for example, in David Linden, Handbook of Batteries (McGraw-Hill, 2d ed. 1995). Secondary electrochemical cells can be recharged for many times, e.g., more than fifty times, more than a hundred times, or more. In some cases, secondary cells can include relatively robust separators, such as those having many layers and/or that are relatively thick. Secondary cells can also be designed to accommodate for changes, such as swelling, that can occur in the cells. Secondary cells are described, e.g., in Falk & Salkind, "Alkaline Storage Batteries", John Wiley & Sons, Inc. 1969; U.S. Pat. No. 345,124; and French Patent No. 164,681, all hereby incorporated by reference. In the embodiments described herein, the battery 12 is a secondary, or rechargeable, battery.

Figure 3:
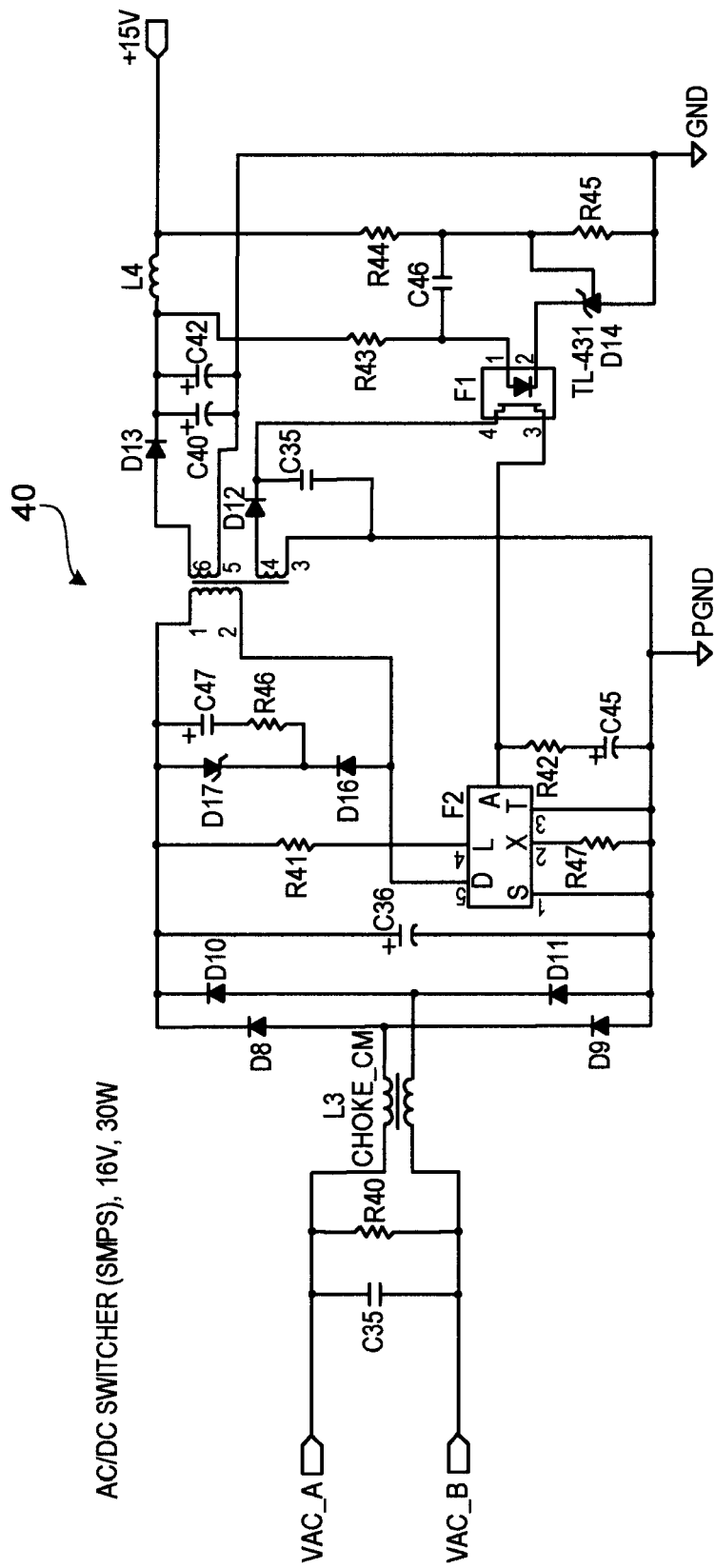
FIG. 3 is an exemplary embodiment of an AC-DC switcher.

The charger 10 is coupled to a power conversion module 11. The power conversion module 11 includes an AC-DC power converter 13 that electrically couples to an external AC power source, such as a source providing power at a rating of 96V-220V and 50 Hz-60 Hz, and converts the externally supplied AC power to a DC power level suitable for charging rechargeable batteries (e.g., DC power levels of approximately between 3.8-4.2 V). The AC-DC power converter 13 may be implemented as an AC-DC switcher configured to accept input power at a first voltage and transform it to a lower voltage. An exemplary embodiment of an AC-DC switcher 40 is shown in FIG. 3. In some embodiments, a DC-DC power converter 15 is incorporated into the power conversion module 11 that is adapted to convert an external DC power source, such as a car's DC power supply, to a DC power level suitable for charging rechargeable batteries may be used. For example, in some embodiments, a car's DC power supply can supply approximately 12V DC power, and the DC-DC transformer 15 converts that power level to a suitable power level. In some embodiments, the AC-DC converter 13 is coupled the DC-DC transformer 15 to thus form a cascade of transformers that are adapted to provide a DC power supply suitable for charging rechargeable batteries. Other power conversion configurations may also be used.

In some embodiments, a DC charging power supply (such as the DC-DC converter 15, which may be implemented as a DC-DC buck converter) is not used, and instead the current and/or voltage output is regulated by directly controlling the current and/or voltage of the AC-DC power converter 13 to levels required for charging of the rechargeable battery or cell. As will be described in greater detail below with respect to FIG. 2, a current feedback loop controls the duty cycle of switch SW1 (14c in FIG. 2), while the output voltage is below a predetermined constant voltage threshold (sometimes referred to as the crossover voltage). When the output voltage equals or exceeds the crossover voltage, the current control feedback is disabled and the voltage feedback block is activated. The voltage feedback block then controls the duty cycle of switch SW1 to provide constant voltage output. In implementations of the feedback mechanism, the current feedback block compares the voltage drop across current sensing resistor 39 (also shown in FIG. 2, and marked R1) to a reference voltage substantially equal to the voltage drop across the resistor 39 at a constant current set point. Similarly, when the charging mechanism operates in a constant voltage mode, the voltage feedback mechanism compares the battery terminal voltage to a reference voltage substantially equal to the crossover voltage value.

The adaptive charger 10 determines a charging current to be applied to the rechargeable battery 12 based on a measured electrical characteristic of the battery 12. The value of the measured electrical characteristic is indicative of the charge rate capability of the battery 12 that is being charged by the charger 10, and thus enables a controller 14 to determine the charging current level to apply to the battery 12. For example, batteries based on lithium-iron-phosphate electrochemical cells generally exhibit a low, internal charging resistance characteristic (intrinsic resistance) during the charging operation. This internal, intrinsic charging resistance generally increases over time. Thus, the internal, intrinsic charging resistance characteristic of the battery and the rate of change thereof can be indicative of the battery state of charge. Other types of batteries are generally characterized by different charging resistances. Therefore, by determining, the charging resistance of the battery that is to be charged, the battery type can be ascertained, and the appropriate charging current for that battery type provided.

In some embodiment, an identification mechanism, to identify the particular battery chemistry of the battery 12 may also he used. For example, in some embodiments the identification mechanism includes an ID resistor coupled to the battery whose resistance value is representative of the battery's chemistry. In such embodiments, the charger 10 may thus identify the chemistry of the battery 12 by measuring the resistance of the ID resistor. Other types of chemistry identification mechanisms may also be employed, including mechanism based on Radio Frequency Identification (RFID) technology in which an RFID device communicates to the charger 10 an electrical signal representative of the battery's chemistry, etc. Other suitable identification mechanisms include mechanisms that implement serial communication techniques to identify the battery, e.g., the Smart Battery SMBus standards to cause identification data representative, for example of the battery's chemistry to be communicated to the charger 10 via a serial data communication interface. A detailed description of exemplary embodiments of chargers and/or battery that use identification mechanism to convey pertinent information regarding the battery is provided, for example, in the concurrently filed patent application entitled "Ultra Fast Battery Charger with Battery Sensing", the content of which is hereby incorporated by reference in its entirety.

The controller 14 is configured to control the operation of the charger 10, including measuring the electric characteristic that is used to identify the type of battery connected to the charger 10, and to determine the charging current and/or charging profile (e.g., duration of charging period, adjustment of charging current and/or voltage at certain time instances, etc.) to apply to the battery 12.

The controller 14 includes a processor device 16 configured to control the charging operations performed on the battery 12 and control operations as will be described below. The processor device 16 may be any type of computing and/or processing device, such as a PIC18F1320 microcontroller from Microchip Technology Inc. The processor device 16 used to implement the charger 10 can include volatile and/or non-volatile memory elements configured to store software containing computer instructions to enable general operations of the processor-based device, as well as implementation programs to perform charging operations on the battery 12 connected to the charger, based on the at least one measured electric characteristic of the rechargeable battery 12. In this example, the processor 16 includes an analog-to-digital converter (ADC) 20 that receives signals from sensors (described below) indicative of the values of the battery's voltage and/or current to the controller 14. In some embodiments, the controller 14 may also include a digital signal processor (DSP) to perform some or all of the processing functions of the control device described herein.

The controller 14 further includes a digital-to-analog converter device (DAC), 22, and/or a pulse-width modulator (PWM), 24, that receives digital signals generated by the processor device 16, and generates in response electrical signals that regulate switching circuitry, such as a buck converter 26, of the charger 10.

The controller 14 receives through the terminals ISENSE (terminal 14a in FIG. 2) and/or the VSENSE terminal (terminal 14b in FIG. 2) one or more input signals corresponding to current and/or voltage of the battery 12 caused in response to test currents or voltages applied by the controller 14 to the terminals of the battery 12. The signals thus received by the controller 14 are thereafter used to determine the appropriate charging current to apply to the battery 12. The controller 14 may receive other data, including, for example, the battery's temperature, and such additional data may also be used to determine how to recharge the battery. Such additional data may be detected and/or collected using appropriate sensors or probes.

Figure 2:
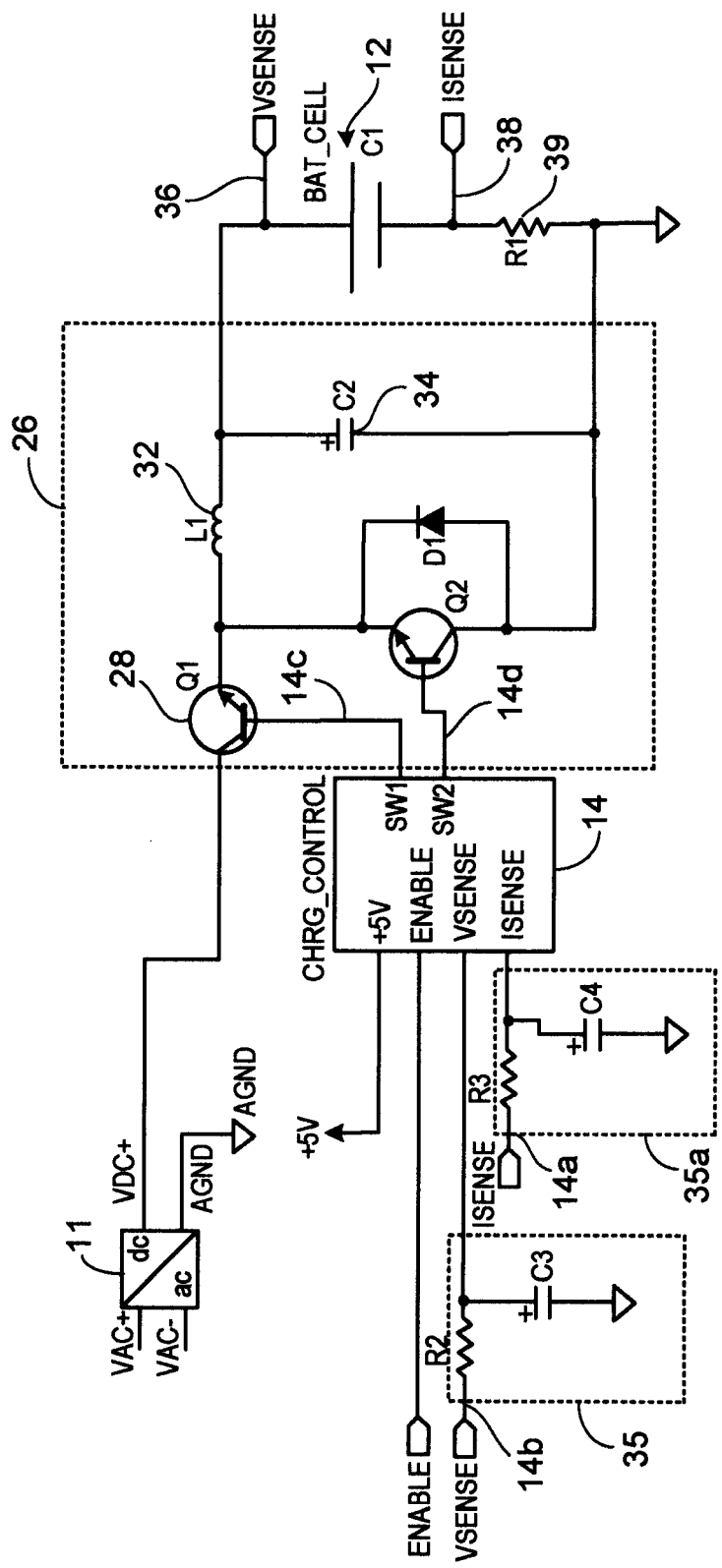
FIG. 2 is a circuit schematic of the charger of FIG. 1.

FIG. 2 shows the buck converter 26 including two Bi-Polar Junction Transistors (BJT's) 28 and 30 and an inductor 32 that stores energy when the power conversion module 11 is in electrical communication with the buck converter 26, and which discharges that energy as current during periods that the power conversion module 11 is electrically isolated from the buck converter 26. The buck converter 26 shown in FIG. 2 also includes a capacitor 34 that is also used as an energy storage element, and also acts to reduce voltage ripple.

Power transmitted to the battery 12 from the power conversion module 11 is regulated by controlling the voltage level applied to the bases of the transistors 28 and 30. Specifically, to cause power from the power conversion module 11 to be applied to the terminals of the battery 12, an actuating electric signal from terminal 14c (marked SW1) of the controller 14 is applied to the base of the transistor 28, resulting in the flow of current from the power conversion module 11 to the transistor 28 and to the battery 12.

When the actuating signal applied to the base of the transistor 28 is withdrawn, current-flow from the power conversion module 11 stops and the inductor 32 supplies current from the energy stored in it. During the off-period of the transistor 28, a second actuating signal is applied by the terminal 14d (marked SW2) of the controller 14 to the base of a transistor 30 to enable current flow from the inductor (using the energy that was stored in the inductor 32 and/or the capacitor 34 during the on-period of the transistor 28) through the battery 12.

The transistor's on-period, or duty cycle, is initially ramped up from 0% duty cycle, while the controller or feedback loop measures the output current and voltage. Once the determined charging current is reached, the feedback control loop manages the transistor duty cycle using a closed loop linear feedback scheme, e.g., using a proportional-integral-differential, or PID, mechanism. A similar control mechanism may be used to control the transistor's duty cycle once the charger voltage output, or battery terminal voltage, reaches the crossover voltage.

Thus, the current provided by the power conversion module 11 during the on-period of the transistor 28, and the current provided by the inductor 32 when it discharges during the transistor's off-period results in an effective current substantially equal to the required charging current. The controller 14 periodically receives (e.g., every 0.1 second) a measurement of the current flowing through the battery 12 as measured, for example, by the current sensor 38 and/or the voltage at the battery terminals, as measured by the voltage sensor 36. Based on this received measured current and/or the measured voltage, the controller 14 adjusts the duty cycle to cause an adjustment to the current flowing through the battery 12 so that that current converges to a value substantially equal to the charging current level determined by the controller 14. The buck converter 26 is thus configured to operate with an adjustable duty cycle that results in adjustable current levels being supplied to the battery 12.

As noted, additional sensors may be coupled to the battery 12 to communicate to the controller 14 corresponding signals. For example, a temperature sensor (e.g., a thermistor) to provide a measure of the battery's temperature may be coupled to the battery 12. The thermistor can be external to the battery or internal to the battery 12. Signals representative of the battery's temperature are received by the controller 14 at one of the controller's ports. The controller 14 determines the battery's temperature from the received signal, and based on the determined temperature, the controller determines any subsequent action to perform. For example, the measured battery temperature could be compared to temperature values stored in the controller 14. If the measured temperature falls outside of an acceptable temperature range, the controller 14 could prevent commencement of the charging operation, terminate the charging operation if the charging operation had already begun, or reduce the charging current and or voltage as appropriate. In some embodiments, the charger 10 does not utilize thermal monitoring and/or thermal control mechanisms.

To determine the charging current to be applied to the battery 12, the controller 14 receives voltage and current measurements from voltage sensor 36 and current sensor 38 that are coupled to the battery 12 and are configured to measure, respectively, the voltage across the terminals of the battery 12 and the current flowing through the rechargeable battery. In some embodiments the charger 10 may cause a current of a particular level (e.g., a charge equivalent to 4-5 C, where 1 C is the current required to charge a rechargeable battery in 1 hour) to be applied to the terminals of the battery 12, thus resulting in a particular voltage drop, which depends on the battery's resistance, at the battery's terminals. The sensed voltage is subsequently received by the VSENSE terminal 14b of controller 14.

In some embodiments, the received input signals are processed using analog logic processing elements (not shown) such as dedicated charge controller devices that may include, for example, threshold comparators, to determine the level of the voltage and current level measured by the sensors 36 and/or 38.

The charger 10 may also include a signal conditioning blocks, such as filters 35a and 35b, for performing signal filtering and processing on analog and/or digital input signals to prevent incorrect measurements (e.g., incorrect measurements of voltages, temperatures, etc.) that may be caused by extraneous factors such as circuit level noise.

Based on those signals received from voltage and current sensors 36 and 38, the controller 14 determines the charging current level that is to be applied to the terminals of the battery 12 to recharge the battery, by computing from those measured signals, for example, the steady-state (or DC) charging resistance of the battery 12.

Particularly, the controller 14 causes a first test current input, $I_1$, to be applied at a first time instance. In response to the applied current level $I_1$, a voltage $V_1$ results at the terminals of the battery 12. The controller 14 causes the current $I_1$ flowing in the battery 12 to be maintained for a particular period of time, thus enabling the battery 12 to reach a charging steady state. In some embodiments, the general time period required to have the battery's electrochemical cells to transition from open circuit conditions to steady state charging conditions is 30-60 seconds. At a subsequent time instance (e.g., 60 seconds after the controller caused the current $I_1$ to be applied to the battery 12), the controller causes another current level, $I_2$, to be applied to the battery 12, thus resulting in a voltage $V_2$ at the terminals of the batteries 12. In some embodiments, the first current level applied may be a current level equivalent to 4 C (i.e., a current level that would cause the battery to charge in 15 minutes, such that if the battery has a capacity of 1 A hours, a 4 C charging rate would be equivalent to 4 A current, whereas the second current level, $I_2$, could be set to a level equivalent to 5 C (i.e., a current level that would cause the battery to be charged within 12 minutes).

Having obtained, for example, the measured voltages corresponding to the applied current levels, the controller 14 determines the battery's charging resistance by computing the difference between the measured closed circuit voltages, divided by the differences of the applied currents, i.e.;

$$R_{chrg} = \frac{V_2 - V_1}{I_2 - I_1}$$

Because the second voltage is measured after a period of time in which the steady-state (i.e., non-transient) resistance value of the battery 12 is achieved, the measured charging resistance is sometimes referred to as the steady-state, or DC, charging resistance.

In some embodiments, other characteristics of the battery 12 may be measured and processed to determine the identity and nature of the battery connected to the charger 10, and thus the charging current that is to be applied to the battery to recharge it.

The controller 14 uses tire computed resistance to access a lookup table that indexes suitable charging currents corresponding to the computed charging resistance. For example, if the computed charging resistance is indicative of a particular battery type and/or capacity, the corresponding entry in the look-up table would specify a charging current suitable for charging that battery.

In some embodiments, a particular battery type may be associated with multiple entries in the lookup table, each one corresponding to a different charging rate. For example, one entry associated with a particular battery type could specify a charging current that would achieve a charge level for the battery equal to approximately 90% of the battery's capacity in approximately 5 minutes. Another entry, associated with the same battery type, could specify a charging current corresponding to a different charging rate, for example, a rate that would recharge the battery to substantially full battery capacity in one (1) hour. The selection of the appropriate entry from multiple lookup table entries associated with a particular battery could be based, for example, on user specified input provided to the charger 10 using a user interface (not shown) that includes, for example, switches, buttons and/or knobs disposed on the charger's body.

The controller may also be configured to determine the specific charge level of the battery 12 to determine the charging parameters (e.g., charging current, and charging period) to be applied to the battery 12. For example, the controller can cause a sequence of current levels to be applied, and measure the voltages provided at the battery's terminals. Using the sequence of measured voltage the battery type as well as the charge level (e.g., in terms of the percentage capacity for the battery) for that battery may be determined. Additionally, the charging period during which the selected charging current would have to be applied may also be determined.

In some embodiments, the determined charge level of the battery 12 can be used to select one of the multiple entries in the lookup table associated with the determined battery type. For example, if the charging period during which charging current would be applied to the battery 12 is specified to be 5 minutes, and the battery is determined to be 50% charged, a first charging current maybe selected from the lookup table that would achieve a recharging of the battery to approximately 100% within the specified 5 minutes. On the other hand, if the battery 12 is only 20% charged, a higher charging current may be selected from the lookup table to cause the approximate 100% charge to be reached within the specified 5 minutes.

In some embodiments, the charging period and/or charging rate for charging the battery 12 may be based on the determined charge level of battery 12. For example, if it is determined that the battery 12 is 50% charged, the determined charging period may be such that the battery 12 is charged to a charge level of, for example, at least 90% in less than 5 minutes (e.g., 3 minutes.)

As noted, the charger 10 may operate in a mode in which it maintains the voltage at the terminals of the battery 12 at about a substantially constant pre-determined upper voltage limit (i.e., the crossover voltage) once that upper limit is reached. Particularly, while the battery 12 is being charged with substantially the charging current determined based on the battery's charging resistance, the voltage at terminals of the battery increases. To ensure that the voltage at the battery's terminals does not exceed the pre-determined upper voltage limit (so that the battery does not overheat, or that the battery's operation or expected life is not otherwise adversely affected), the voltage at the terminals of the battery 12 is periodically measured (e.g., every 0.1 seconds) using the sensor 36 to determine when the pre-determined upper voltage limit has been reached. When the voltage at the terminals of the battery 12 has reached the pre-determined upper voltage limit, the current/voltage regulating circuit is controlled to cause a substantially constant voltage at the terminals of the battery 12 (devices that implement such a behavior are sometimes referred to as Constant Current/Constant Voltage, or CC/CV, devices)

In some embodiments, the controller 14 may also be configured to monitor the voltage increase rate by periodically measuring the voltage at the terminals of the battery 12, and adjusting the charging current applied to the battery 12 such that the pre-determined upper voltage limit is reached within some specified voltage rise period of time. Based on the measured voltage increase rate, the charging current level is adjusted to increase or decrease the charging current such that the pre-determined upper voltage limit is reached within the specified voltage rise period. Adjustment of the charging current level may be performed, for example, in accordance with a predictor-corrector technique that uses a Kalman filter. Specifically, Kalman filters use the internal state of a dynamic system to recursively predict the value of the system based on measurements of the system's response to previous excitation or input. Kalman filter techniques may account for both measurement uncertainty and uncertainty in the predicted (modeled) system response. Thus, in operation, the predicted outcome of the system is used to recursively correct the new response measurements based, at least in part, on prior predicted and actual measurements. The Kalman filter thus attempts to minimize the error between predicted system response and the actual measured response. Other techniques for determining adjustments to the current to achieve the pre-determined upper voltage limit may be used.

Figure 4:
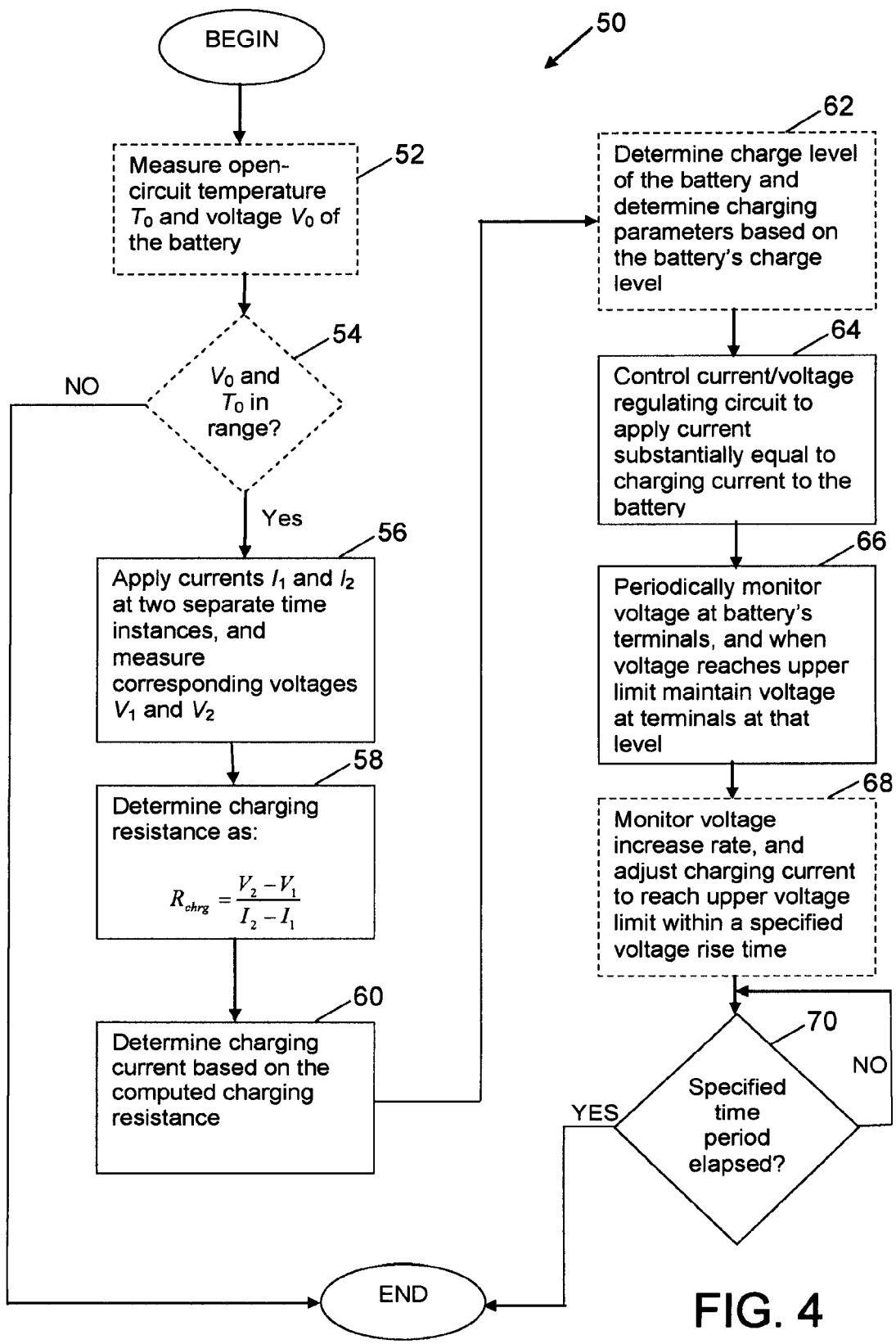
FIG. 4 is a flow diagram of an exemplary embodiment of a charging procedure to recharge a rechargeable battery.

FIG. 4 depicts an exemplary embodiment of a charging procedure 50 to recharge the rechargeable battery 12. Optionally, after the battery 12 is inserted into the charging compartment of the charger 10 so that the charging terminals of the charger 10 are electrically coupled to the terminals of the battery 12, the controller 14 measures 52 the open-circuit temperature and voltage of the cells of the battery 12. The controller 14 determines 54, whether the initially measured temperature $T_0$ and voltage $V_0$ are between predetermined upper and lower limits, as may be specified in the storage module of the processor-based device 16 used in the controller 14. In circumstances in which it is determined that the measured initial temperature and voltage are not within the predetermined acceptable range, thus rendering a charging operation under current conditions to be unsafe, the charger does not proceed with the charging operation, and the procedure 50 terminates.

If it is determined that the initially measured temperature $T_0$ and voltage $V_0$ are between the predetermined upper and lower limits, the controller 14 causes 56 two current levels $I_1$ and $I_2$, at two separate time instances, to be applied to the battery 12 to facilitate the measurement and/or computation of at least one electrical characteristic (e.g., battery terminal voltage) of the battery 12. The measured at least one electric characteristic is either itself indicative of the type of battery connected to the charger 10 or enables determination of a derived characteristic (e.g., the steady-state charging resistance) which enables determination of the charging current to be applied to the battery 12. In embodiments in which the charging resistance is determined based on measured voltages, the controller 14 determines the respective voltages $V_1$ and $V_2$ corresponding to the applied currents $I_1$ and $I_2$. Other types of electric characteristics maybe measured (e.g., measured currents corresponding to applied voltages).

Having measured the voltages $V_1$ and $V_2$, the charging resistance corresponding to the battery 12 can he determined, 58, as:

$$R_{chrg} = \frac{V_2 - V_1}{I_2 - I_1}$$

The computed charging resistance is used to determine 60 the charging current to apply to the battery 12 by, for example, accessing the lookup table stored on a memory storage module that indexes suitable charging currents corresponding to the computed charging resistance. With battery types that are associated with multiple charging current entries, a user specified desired charging period may be used to select the appropriate entry associated with the battery type identified from the measured and/or computed battery characteristic. Additionally and/or alternatively, other techniques (e.g., computational techniques) for determining the charging current may be used.

Optionally, the specific charge level of the connected battery 12 is determined 62 to compute the charging parameters (e.g., charging current, and charging period) to be applied to the battery 12. As explained above, under circumstances where the battery charge level is determined by, for example, causing a sequence of current levels to be applied to the battery 12 and measuring the respective resulting voltages at the battery's terminals, the battery charge level may be determined. Based on the determined charge level and battery type, the charging parameters (e.g., charging current and charging period) may be determined.

Having determined the charging current to be applied to battery 12, and optionally the charging period, a current/voltage regulating circuit, such as the buck converter 26 shown in FIG. 2, is controlled, 64, to cause a voltage from the power conversion module 11 to provide a constant current to the rechargeable battery 12. As explained, the charging current level value computed at 60 is processed to generate a duty cycle signal to cause current substantially equal to the charging current to be applied to the battery 12. Thus, the controller's output signals are applied, for example, to the transistor 28 of the buck converter 26 to cause voltage from the power conversion module 11 to be applied to the battery 12. During the off-time of a particular duty cycle, the power conversion module 11 is cutoff from the battery 12, and the energy stored in the inductor 32 and/or the capacitor 34 is discharged to the battery as a current. The combined current applied from the power conversion module 11, and the current discharged from the inductor 32 (and/or the capacitor 34) result in an effective current substantially equal to the charging current.

While the battery 12 is being charged with substantially a constant current, the voltage at terminals of the battery increases. To ensure that the voltage at the battery's terminals does not exceed a pre-determined upper voltage limit (the crossover voltage), the voltage at the terminals of the battery 12 is periodically measured 66 (e.g., every 0.1 seconds) to determine when the pre-determined upper voltage limit has been reached. When the voltage at the terminals of the battery 12 has reached the pre-determined upper voltage limit, the current/voltage regulating circuit is controlled (e.g., through electrical actuation of the transistors 28 and 30) so that the power conversion module 11 applies a voltage that results in constant voltage level at the terminals of the battery 12.

Optionally, the voltage increase rate may be periodically measured, 68, to cause the pre-determined upper voltage limit to be reached within the specified voltage rise period of time.

Based on the measured voltage increase rate, the charging current level is adjusted (with a corresponding adjustment of the actuating signal applied to the current/voltage regulating circuit) to increase or decease the charging current such that the pre-determined upper voltage limit is reached within the specified voltage rise period. As described herein, adjustment of the charging current level may be performed in accordance to a predictor-corrector technique such as a Kalman filter or some other similar approach.

After a period of time substantially equal to the specified charging period has elapsed, as determined 70, the charging current applied to the battery 12 is terminated (for example, by ceasing electrical actuation of the transistor 28 to cause power delivered from the power conversion module 11 to be terminated). The charging procedure is terminated at the expiration of a specified period of time after the pre-determined upper voltage limit of the battery 12 has been reached, or after a specified charge level of the battery 12 has been reached.

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:

1. A method for charging a rechargeable battery comprising at least one rechargeable electrochemical cell, the method comprising:
   determining by a processor device an internal, intrinsic charging resistance characteristic of the battery, with the internal, intrinsic charging resistance being indicative of battery chemistry type of the rechargeable battery;
   determining a charging current to be applied to the rechargeable battery based on the determined internal, intrinsic charging resistance characteristic of the rechargeable battery; and
   applying the determined charging current to the rechargeable battery.

2. The method of claim 1, wherein applying the determined charging current further comprising:
   periodically determining the internal intrinsic charging resistance characteristic, and
   periodically adjusting the level of the determined charging current to apply to the rechargeable battery.

3. The method of claim 1, further comprising:
   regulating current applied to the rechargeable battery according to the determined charging current.

4. The method of claim 1, wherein determining the internal, intrinsic charging resistance characteristic comprises:
   measuring by the processing device voltage between terminals of the battery in response to applying current to the battery at a first time instance; and
   measuring by the processing device voltage between the terminals of the battery in response to applying current to the battery at a subsequent time instance.

5. The method of claim 4, further comprises:
   computing by the processing device a steady-state charging resistance based on a difference between the voltage measured at the first and subsequent time instances divided by a difference in currents applied at the first and subsequent time instances.

6. The method of claim 1, wherein determining the charging current comprises:
   accessing by the processing device based on the determined internal intrinsic charging resistance characteristic, a lookup table, the look-up table stored in a computer storage and storing multiple charging current values, associated with each of the determined values for charging resistance characteristic; and
   selecting one of the multiple charging current values stored in the lookup table based, at least in part, on the determined intrinsic charging resistance characteristic the battery.

7. The method of claim 6, wherein the determined internal intrinsic charging resistance is representative of a steady-state charging resistance of the battery.

8. The method of claim 1, further comprising:
   periodically measuring the voltage between terminals of the battery; and
   adjusting the charging current applied to the battery when the measured voltage between the terminals of the battery reaches a pre-determined voltage value, to maintain the voltage between the terminals of the battery at the pre-determined voltage value.

9. The method of claim 1, further comprising:
   periodically adjusting the charging current to cause a pre-determined voltage level between terminals of the battery to be reached within a specified time period.

10. The method of claim 9, wherein periodically adjusting the charging current comprises:
    determining a rate of voltage rise at the terminals of the battery; and
    computing the charging current based on the determined rate of voltage rise using a predictor-corrector computation technique.

11. The method of claim 10, wherein the predictor-corrector computation technique is based on a Kalman filter.

12. A charging device configured to charge a rechargeable battery comprising at least one rechargeable electrochemical cell, the device comprising:
    a charging compartment configured to receive the battery, the charging compartment having electrical contacts configured to be coupled to respective terminals of the battery; and
    a controller configured to:
      determine an internal, intrinsic charging resistance characteristic of the battery, with the internal, intrinsic charging resistance being indicative of battery chemistry type of the battery;
      determine a charging current to be applied to the battery based on the determined internal, intrinsic charging resistance characteristic of the rechargeable battery, and
      cause the determined charging current to be applied to the battery.

13. The device of claim 12, wherein the controller is further configured to:
    periodically determine the internal, intrinsic charging resistance characteristic, and
    periodically adjust the level of the determined charging current to be applied to the battery.

14. The device of claim 13, further comprising:
    a power conversion module; and
    a current/voltage regulating circuit electrically coupled to the power conversion module, the current/voltage regulating circuit configured to cause current substantially equal to the determined charging current to be applied to the battery based, at least in part, on the charging current determined by the controller.

15. The device of claim 14, wherein the current/voltage regulating circuit comprises:

a buck converter circuit configured to operate with an adjustable duty cycle and to supply current to the battery during time periods corresponding to the adjustable duty cycle, wherein the adjustable duty cycle is determined by the controller.

16. The device of claim 12, wherein the controller configured to determine the internal, intrinsic, charging resistance characteristic is configured to:

measure voltage between the terminals of the battery in response to current applied to the battery at a first time instance; and measure voltage between the terminals of the battery in response to current applied to the battery at a subsequent time instance.

17. The device of claim 16, wherein the controller is further configured to:

determine a steady-state charging resistance based on a difference between the voltage measured at the first and subsequent timer instances divided by a difference in currents applied at the first and subsequent time instances.

18. The device of claim 12, wherein the controller comprises:

a lookup table having multiple charging current values, associated with each of the determined values representative of a charging current characteristic, and wherein the controller configured to determine the charging current is configured to:

access the lookup table; and select one of multiple charging current values stored in the lookup table based, at least in part, on the determined internal, intrinsic charging resistance-characteristic.

19. The device of claim 18, wherein the determined value is representative of a steady-state charging resistance of the battery.

20. The device of claim 12, wherein the controller is further configured to:

periodically measure a voltage between the terminals of the battery;

adjust the charging current applied to the battery when the measured voltage between the terminals of the rechargeable battery reaches a pre-determined voltage value, to maintain the voltage between the terminals of the rechargeable battery at the pre-determined voltage value.

21. The device of claim 12, wherein the controller is further configured to:

periodically adjust the charging current such that a pre-determined voltage level between terminals of the battery is reached within a specified time period.

22. The device of claim 21, wherein the controller configured to periodically adjust the charging current is configured to:

determine a rate of voltage rise at the terminals of the battery;

compute the charging current based on the determined rate of voltage rise using a predictor-corrector computation technique.

23. The device of claim 22, wherein the predictor-corrector computation technique is based on a Kalman filter.

24. The device of claim 12, wherein the controller includes a processor-based micro-controller.

25. The device of claim 12, further comprising the rechargeable battery.

26. The device of claim 25, wherein the rechargeable battery includes a lithium-iron-phosphate rechargeable battery.

* * * * *